(12) United States Patent
Garchery et al.

(10) Patent No.: US 12,105,801 B2
(45) Date of Patent: Oct. 1, 2024

(54) METHOD FOR INTRUSION DETECTION TO DETECT MALICIOUS INSIDER THREAT ACTIVITIES AND SYSTEM FOR INTRUSION DETECTION

(71) Applicant: BULL SAS, Les Clayes-sous-Bois (FR)

(72) Inventors: Mathieu Garchery, Munich (DE); Michael Granitzer, Passau (DE)

(73) Assignee: BULL SAS, Les Clayes-sous-Bois (FR)

( * ) Notice: Subject to any disclaimer, the term of this patent is extended or adjusted under 35 U.S.C. 154(b) by 248 days.

(21) Appl. No.: 17/775,261

(22) PCT Filed: Mar. 30, 2020

(86) PCT No.: PCT/EP2020/058972
§ 371 (c)(1),
(2) Date: May 6, 2022

(87) PCT Pub. No.: WO2021/089196
PCT Pub. Date: May 14, 2021

(65) Prior Publication Data
US 2022/0391508 A1 Dec. 8, 2022

(30) Foreign Application Priority Data
Nov. 8, 2019 (DE) .......................... 102019130177.7

(51) Int. Cl.
*G06F 21/56* (2013.01)
*G06F 21/31* (2013.01)
(52) U.S. Cl.
CPC .......... *G06F 21/566* (2013.01); *G06F 21/316* (2013.01)

(58) Field of Classification Search
None
See application file for complete search history.

(56) References Cited

U.S. PATENT DOCUMENTS

| 2013/0091539 A1 | 4/2013 | Khurana et al. |
| 2019/0260786 A1* | 8/2019 | Dunn .................... H04L 43/045 |

OTHER PUBLICATIONS

International Search Report issued in PCT/EP2020/058972, dated Jul. 24, 2020 (15 pages).
Wikipedia, "Long Short-Term Memory", dated Jul. 1, 2020 (12 pages).

* cited by examiner

*Primary Examiner* — Syed A Roni
(74) *Attorney, Agent, or Firm* — ARC IP Law, PC; Joseph J. Mayo

(57) ABSTRACT

A method and system for intrusion detection to detect malicious insider threat activities within a network user profiles. The method includes determining a behavior pattern for each user profile based on activity events, wherein the determination of the behavior pattern is executed by a Recurrent Neural Network. The method includes determining normal activity events and abnormal activity events for each user profile based on the behavior patterns, wherein the determination of the normal activity events and the abnormal activity events is executed by a Feed-Forward Neural Network. The method includes evaluating whether a recorded activity event is a normal activity event or an abnormal activity event based on the behavior pattern and the determined normal activity events and abnormal events for that user profile. The method includes detecting malicious activity for the user profile, if the recorded activity event is evaluated as an abnormal activity event.

10 Claims, 3 Drawing Sheets

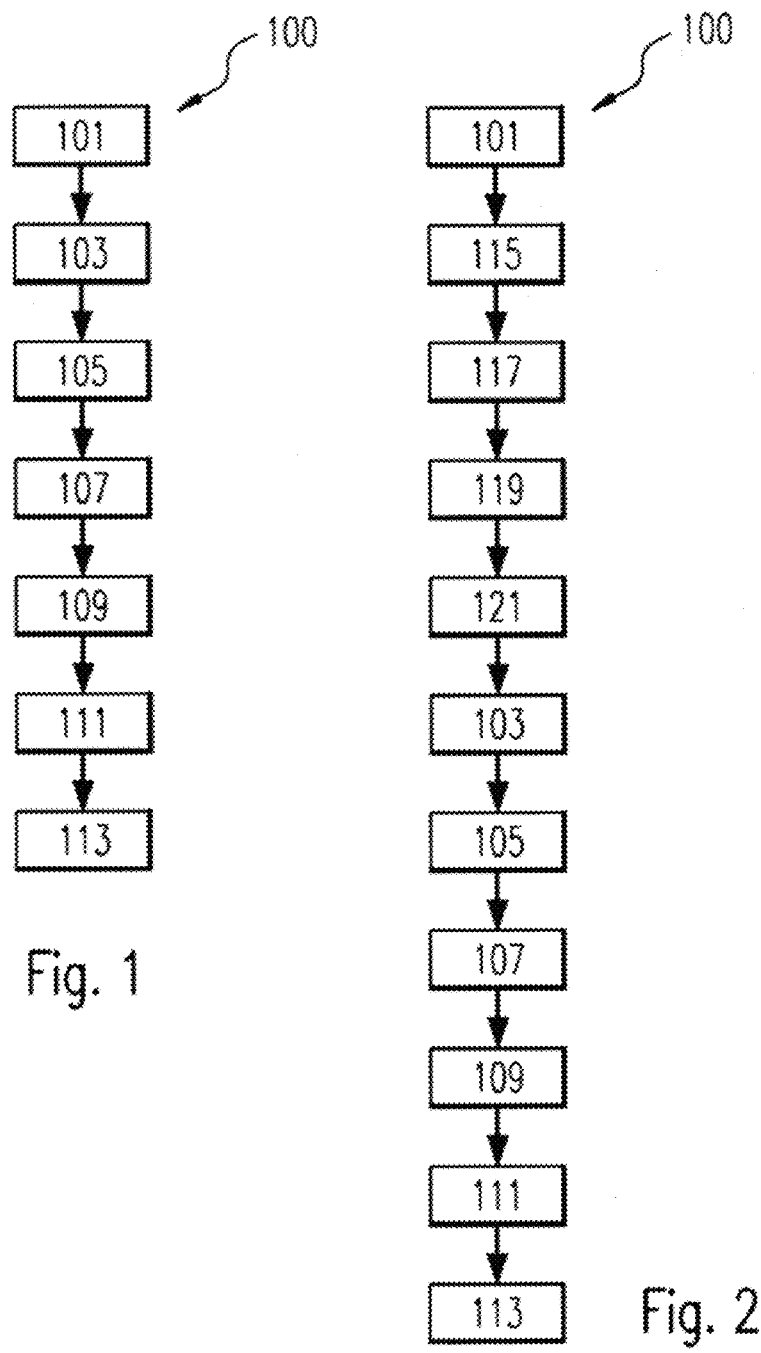

METHOD FOR INTRUSION DETECTION TO DETECT MALICIOUS INSIDER THREAT ACTIVITIES AND SYSTEM FOR INTRUSION DETECTION

This application is a national phase application under 35 U.S.C. § 371 of International Application No. PCT/EP2020/058972, which claims priority to German Patent Application Number DE102019130177.7, filed 8 Nov. 2019, the specifications of which are hereby incorporated herein by reference.

BACKGROUND OF THE INVENTION

Field of the Invention

The invention relates to a method for intrusion detection to detect malicious insider threat activities. The invention further relates to a system for intrusion detection that is configured to execute the method for intrusion detection to detect malicious insider threat activities.

Description of the Related Art

Cyber-attacks are one of the biggest risks that threatens an operational IT system and can lead to an exposure of sensitive personal and business data or even cause some serious damage. These attacks are becoming more sophisticated and hard to defend against which increases the difficulty of accurately detecting intrusions. Several intrusion detection methods have been introduced in the literature to tackle those threats, but they are unable to handle challenging scenarios in which new classes may appear after the learning stage.

In 2019, the cost of a data breach for an organization is estimated at $3.92 M. Moreover, the likelihood of experiencing a data breach in the next two years is rising as well, reaching 29.6%. In light of the ever increasing amounts of data generated by such organizations, automated protection solutions are now essential to mitigate this risk. Intrusion detection systems (IDS) represent one key component of protection. Their goal is to monitor information systems for security policy breaches, so as to detect malicious behavior in a timely manner. This is a critical first step towards counteraction and protection. Two complementary types of IDS exist: signature-based and anomaly detection systems. The first type relies on finding known patterns of attacks (i.e. signatures) while the second assumes that anomalies—observations deviating from the majority—are malicious. This last assumption is critical, as a mismatch between anomalies and malicious attacks can deteriorate detection performance significantly (through high false negative and/or false positive rates).

Still, anomaly-based IDS are preferred for their capacity to detect new threats, which are out of reach for signature-based IDS. A significant proportion of all attacks comes from insider threats, i.e. legitimate users who abuse their access rights to IT systems to conduct malicious activities such as data theft, sabotage, and so on. A recent whitepaper reports that 90% of organizations feel vulnerable to insider threats, and 53% of them confirmed having been targeted in the last 12 months. Insider threats are particularly harmful to organizations because the attacker usually possesses knowledge about its digital environment, which can help both increase attack impact and evade detection.

Machine learning (ML) is particularly useful in this domain because it allows analyzing large amounts of data, which would be impossible to process using manual inspection. However, ML methods for intrusion detection face following challenges: Detection performance level must be very high for the system to be useful in practice. The cost of both false negatives and false positives is high: missing many intrusions is unacceptable but at the same time false positive rate must be kept very low (otherwise thousands of false alarms will be generated due to huge data amounts).

In order to meet these performance requirements, much effort is put into feature engineering. This is time consuming, requires extensive domain knowledge and is very specific to each use case/dataset. Data aggregation is often used to reduce noise but it has the drawback of increasing the data granularity at which intrusions can be detected (e.g. detection on per day basis instead of per minute). Most existing ML-based intrusion detection systems only support numeric attributes ("features"). Thus integrating other data types (categorical, text, graph, etc.) is not straightforward.

It should be noted that comparing intrusion detection systems is very difficult as they have specific operational requirements (audit records on which they operate, type of intrusions to detect, performance metrics for evaluation). Existing intrusion detection methods usually do not support graph data and therefore discard such features because of incompatibility.

However, graph features can be very useful for intrusion detection as shown in our experiments. Moreover, most existing systems perform data aggregation as preprocessing step in order to get more robust detection results. The drawback is that intrusion alarms are then issued at coarse-grained granularity level (e.g. one day) which hinders identifying precisely which user action lead to the alarm.

Thus, one objective of one or more embodiments of the invention is to provide an improved method for intrusion detection to detect malicious insider threat activities that is capable of overcoming or mitigating the deficiencies present in the state of the art. Another objective of one or more embodiments of the invention is to provide a system that is configured to execute the method for intrusion detection to detect malicious insider threat activities.

BRIEF SUMMARY OF THE INVENTION

The objectives are solved by one or more embodiments of the method and system according to the independent claims. One or more embodiments of the method and system are specified in the dependent claims.

At least one embodiment of the invention regards the development and improvement of an unsupervised machine learning system which analyzes data from different sources and detect malicious insider threat activities.

According to one or more embodiments the invention, a method for intrusion detection to detect malicious insider threat activities within a network of multiple interconnected computerized user profiles is provided, wherein each user profile is configured to assess the validity of activity events within the network of interconnected user profiles, comprising the following method steps:
 Providing multiple activity events for each user profile,
 Determining a behavior pattern for each user profile based on the multiple activity events, wherein the determination of the behavior pattern is executed by at least one trained Recurrent Neural Network,
 Determining normal activity events and abnormal activity events for each user profile based on the multiple behavior patterns, wherein the determination of the normal activity events and the abnormal activity events is executed by a trained Feed-Forward Neural Network, Recording a further activity event of at least one user profile of the multiple user profiles, Evaluating whether the recorded activity event of the at least one user profile is a normal activity event or an abnormal activity event based on the behavior pattern and the determined normal activity events and abnormal events for that user profile, wherein the evaluation of the recorded activity event is executed by the Feed-Forward Neural Network, and Detecting malicious activity for the at least one user profile, if the recorded activity event is evaluated as an abnormal activity event.

This achieves the technical advantage, by way of at least one embodiment, that an effective and efficient method for intrusion detection to detect malicious insider threat activities within a network of multiple interconnected computerized user profiles can be provided, that is capable of detecting malicious activity on an event level.

For this, two neural networks, a Recurrent Neural Network and a Feed-Forward Neural Network, are used to evaluate multiple activity events for each of the multiple interconnected user profiles of a network within a company or organization.

For the evaluation of the multiple activity events for each user profile, a multiplicity of activity events is provided. The provided activity events, by way of one or more embodiments, can be previous activity events of the respective user profile. In at least one embodiment, the provided activity events can be simulated activity events, that do not correspond to actual previous activity events of that particular user profile. The provided multiple activity events are used as training data for the two neural networks.

Based on the multiple activity events the Recurrent Neural Network is trained to determine a behavior pattern for the respective user profile of the multiple activity events. The behavior pattern allows to determine a certain behavior based on respective activity events of a certain user profile during a particular time span.

Based on the generated behavior patterns for each of the user profiles, according to one or more embodiments, the Feed-Forward Neural Network is trained to determine normal activity events and abnormal activity events for each of the user profiles. Normal activity events in this case comply with the behavior defined by the respective behavior pattern of a particular user profile. Abnormal activity events in contrast do not comply with a certain behavior defined by the behavior pattern of a particular user profile.

In order to detect malicious insider threat activities, in at least one embodiment, further activity events for different user profiles are recorded. The recorded activity events in this case are actual real activity events that are executed by the respective user profile. The recorded activity events that are executed by the user profiles, in one or more embodiments, can be activity events that take place within the network of the multiple interconnected computerized user profiles or that are executed in interaction with entities that do not belong to the network.

After the recording of the actual real activity events executed by the user profiles, in one or more embodiments, a Feed-Forward Neural Network evaluates based on its training knowledge from the determination of normal activity events and abnormal activity events with regard to respective behavior patterns, whether the recorded activity event is a normal activity event or an abnormal activity event with regard to the respective behavior pattern of a particular user profile.

If the Feed-Forward Neural Network evaluates that at least one of the recorded activity events is an abnormal activity event, a malicious activity of that particular user profile is detected.

This way, by way of one or more embodiments, malicious activities within a network of interconnected computerized user profiles can be detected on an event level.

In one or more embodiments, a user profile is a computerized profile that is generated to allow a certain user access to a computerized network of multiple computerized workplaces. Via the user profile, in at least one embodiment, the respective user can execute a data communication with other user profiles, that is other users, of the network. A user profile can be assigned individually to a certain user. In one or more embodiments, a user profile can be assigned to a certain computerized workplace.

In application to a company or organization, in at least one embodiment, the user profile is a logon profile installed on a computer workplace via which an employee can access the intranet of the company or organization.

In one or more embodiments, a network is a network of multiple interconnected computerized workplaces. In particular, a network can be a network, i.e. the intranet of computers of a company or a comparable organization. The employees can individually access the network via respective user profiles. The provides a data communication between the multiple computers of the network or access to data of internal databanks of the respective company or organization.

In one or more embodiments, an activity event is an individual activity that a certain user profile executes either within the network of interconnected computerized user profiles or between an entity external to the network of interconnected computerized user profiles. An activity event is assigned to a particular computerized user profile. For example, in at least one embodiment, an activity event can be the generation or deletion of a certain data file. An activity event can further be an access to certain data banks, or a data communication between another user profile of a network. For example, in one or more embodiments, an activity event can comprise a logon event, where a certain user or employee of the company or organization logs on into a certain user profile, or an e-mail event, where a user profile sends or receives an e-mail to or from either another user profile of the network or an e-mail account assigned to an external entity to the network, or a web browsing event, where a user profile of the network accesses a certain web page of the Internet.

In one or more embodiments, a behavior pattern provides information regarding the behavior of a certain user profile based on multiple previous activity events of that particular user profile. A behavior pattern can illustrate the behavior of that particular user profile for a predetermined time span. A behavior pattern is individually assigned to a certain user profile.

In at least one embodiment, a normal activity event is an activity event that complies with the behavior pattern of the respective user profile. In one or more embodiments, an abnormal activity event is an activity event that does not comply with the behavior pattern of that particular user profile.

In at least one embodiment, a malicious insider threat activity is an activity that is assigned to a certain user profile of the network of multiple interconnected user profiles that because of its abnormal character with regard to the usual activity events of a certain user profile indicates that this activity event can present a threat to the security of the network of interconnected user profiles. A malicious insider threat activity can be due to an activity performed by a user or employee of the company or organization via the respective user profile. In one or more embodiments, a malicious activity can also result in the hacking of a particular user profile by an entity external to the respective company or organization.

It should also be noted that not all intrusion detection use cases contain heterogeneous data. Another uncommon characteristic of the method resides in its ability to perform detection at event (log line) level. This goes against the flow of practical intrusion detection systems which rely on complex feature engineering and data aggregation.

At least one embodiment of the invention consists in an ML-based method to learn and predict whether a link between two entities is valid. In the context of intrusion detection, in one or more embodiments, an invalid link corresponds to an intrusion alert and entities are typically users, PCs, web domains, etc. Inputs represent user actions (at chosen aggregation level, which can be as fine as log line level) and outputs are anomaly scores corresponding to given inputs.

A recurrent neural network is used to model the sequence of user actions. At time t, it is trained to predict the next input (at t+1) using inputs from t-n to t, where n is the number of timesteps of the Recurrent Neural Network. The Recurrent Neural Network also keeps track of its state separately for each user, which contains relevant previous inputs (before t-n). For the link validity prediction, a feedforward neural network is used.

Using a Recurrent Neural Network allows to model the temporal dependencies in the inputs (user events in the case of intrusion detection). Reusing the Recurrent Neural Network state as input for the Feed-Forward Neural Network forces the neural networks to learn which input features are relevant, thus reducing the need for feature engineering. It is also a simple and powerful way of encoding the history of previous inputs to be used by the Feed-Forward Neural Network for link validity prediction. Negative sampling allows the method of one or more embodiments of the invention to learn to distinguish normal from abnormal links between origin and destination entities. Modeling each event (log line) as a link from a source entity to another destination entity makes it possible to perform anomaly detection in graph data at fine-grained edge level. For intrusion detection, this corresponds to assigning an anomaly score to individual user events (log lines).

According to at least one embodiment, the method further comprises:
Stopping all activities of the at least one user profile and and/or removing the at least one user profile from the network.

This achieves the technical effect, that after detection of the malicious activities the security of the network can be maintained or re-established.

According to at least one embodiment, the method further comprises:
Generating a graph representation of the multiple activity events for each of the user profiles, wherein the activity events are represented by edges within the graph representation,
Using neural network embeddings to represent each of the multiple activity events of each of the user profiles, and
Using the multiple activity events containing graph embeddings as inputs to the Recurrent Neural Network and/or the Feed-Forward Neural Network.

This achieves the technical advantage, that an unambiguous and contentful representation of activity events can be provided. Via the graph representation of the multiple activity events for each of the user profiles a contentful representation of the complex data related to the multiple activity events of a user profile can be provided. Due to the graph representation information regarding the nature of the activity event as well as further entities related via the respective activity events can be included into the representation of the respective activity event data.

Further, in one or more embodiments, certain activity events can be provided with further attributes that allow a clearer identification of that particular activity event and a more detailed information content of that particular activity event. For example, in at least one embodiment, a particular e-mail event can be attributed with information regarding the sender and receiver of that particular e-mail, a particular time stamp of the sending and/or receiving process, as well as other information of interest regarding that particular e-mail event.

Through the embedding of the respective graph representations the individuality of the graph representation can be maintained. For example, in at least one embodiment, through the embeddings proximity between certain nodes in the graph representation can be maintained such that vector representations of the respective nodes are positioned in the vector space of the respective embedding with comparable proximity. Thus, via the embeddings characteristic features of the graph representation are maintained. This allows for a more detailed input data to the neural networks.

The graph embeddings as input data to the Recurrent Neural Network and/or the Feed-Forward Neural Network allow for a more detailed and sophisticated training data and therefore for a more advanced training of the respective neural networks. This leads to better prediction and evaluation results of the respective networks.

Graph embedding is a widely used technique alongside with link prediction, classification and clustering in organizational network analysis to learn low-dimensional representations for nodes in graphs. In at least one embodiment of the invention, graph embedding techniques are utilized to improve the classification of insider threat behaviors.

Graph Embedding techniques transform nodes within a graph into low-dimensional dense vectors so that vectors representing nodes which are similar in the original graph are positioned with close proximity to each other in the low-dimensional expression space. The method in at least one embodiment of the invention relies on node embeddings to represent edges, in that edges are represented as an aggregation of nodes connected to them, extended by information associated with edges themselves (edge attributes). Many approaches can be used in graph embeddings and are generally categorized as either community or role-based.

The goal in graph-based intrusion detection is to identify an anomalous node, edge or sub-graph that do not conform to the expected behavior in the graph. Community-based embeddings are known to remain stationary over time, which allows us to raise a flag whenever a group of nodes suddenly becomes more similar to another community. While role-based embeddings help detecting anomalies which are defined with reference to the structural properties and behavior in a given network.

Especially graph and text features are often discarded as they are not natively supported by many methods, unlike numeric and categorical features. In at least one embodiment of the invention, graph features are leveraged by modeling user events (equivalent to log lines) as graph edges representing interactions between entities. For instance, in one or more embodiments, an email being sent corresponds to an edge from the sender to the receiver. Edges can be augmented with attributes to provide context, (e.g. the time the email was sent, whether it contains attachments, etc.). Such attributes can be numeric, categorical and even text content.

According to at least one embodiment, for each of the multiple user profiles an individual Recurrent Neural Network and an individual Feed-Forward Neural Network is used.

This achieves the technical advantage, that an effective and efficient intrusion detection for multiple user profiles can be provided. By providing each of the multiple user profiles of the network with an individual Recurrent Neural Network and an individual Feed-Forward Neural Network a more precise training of the respective neural networks based on individual activity events of that particular user profile can be achieved. By using better trained neural networks a better prediction and evaluation of activity events of that particular user profile can be achieved. This leads to an improved intrusion detection of malicious activities of the user profiles.

According to at least one embodiment, the method further comprising:
Training the Recurrent Neural Network and the feed-Forward Neural Network jointly based on the multiple activity events and the behavior pattern for each of the user profiles.

This achieves the technical advantage, that the neural networks are configured to learn which input features of the activity events are relevant. During the training process the multiple activity events are input to the Recurrent Neural Network, which is trained to output a certain behavior pattern based on these multiple activity events. The output behavior pattern is then used as a training input to the Feed-Forward Neural Network, which is trained to determine normal activity events and abnormal activity events based on the behavior pattern.

This way, by way of one or more embodiments, the Recurrent Neural Network as well as the Feed-Forward Neural Network are forced to learn the relevant input features of the input multiple activity events of that particular user profile. This way, in at least one embodiment, the need for feature engineering can be reduced.

Further, in one or mor embodiments, the reuse of the behavior pattern generated by the Recurrent Neural Network as input training data for the Feed-Forward Neural Network provides a simple and powerful way of encoding the history of previous inputs to be used by the Feed-Forward Neural Network to provide a validity of a predicted future activity event. Further, in at least one embodiment, by the joined training of the Recurrent Neural Network and the Feed-Forward Neural Network a more precise and controllable training can be achieved, as both neural networks are trained on identical data sets.

As the Recurrent Neural Network and Feed-Forward Neural Network are trained jointly, one batch of data is passed through each one of them, then backpropagation is performed. Using the input at time t along with the current RNN state (for a given user), the FFNN is trained to predict whether some link present in input t is valid.

For example, in one or more embodiments, if inputs are records of users logging in to PCs, input t would contain a link as user-PC pair (in form of a user identifier and a PC identifier, which are then converted to numeric vector representations using an embedding layer). Additional features relative to this link can be included (such as the time when the logins occurs). At training time, positive examples (i.e. valid links) are retrieved from the activity history. Negative examples (i.e. invalid links) are generated by randomly sampling unobserved source-destination entity pairs (e.g. a PC never accessed by given user). Once the model is trained, it directly outputs the probability of each link to be valid, which can be interpreted as an anomaly score.

According to at least one embodiment, activity events comprise logon events and/or email events and/or web browsing events, wherein a logon event comprises a logon to a user profile, wherein an email event comprises the sending and/or receiving of an email via a user profile, and wherein a web browsing event comprises the access of web pages via a user profile.

This achieves the technical advantage, that a method for intrusion detection to detect malicious insider threat activities within a network of interconnected user profiles can be provided that is capable of detecting insider threats in activities most relevant for the detection of malicious activity. By observing logon events, in which a certain user or employee of the company or organization logs into a respective user profile, a class of events which is most vulnerable to malicious activity due to the logon via man authorized personnel is covered by the method for intrusion detection.

By observing e-mail events, in which e-mails are sent and/or received between a user profile of the network of interconnected user profiles and either another user profile of the network or an entity external to the network of the company or organization, another class of activity extremely vulnerable to malicious activities can be observed via the method for intrusion detection.

Further, in at least one embodiment, by observing web browsing events, in which a user profile of the network of interconnected user profiles accesses web pages of the Internet, a further class of activities very vulnerable to threats by malicious activities can be observed. Thus, an effective and efficient method for intrusion detection can be provided.

According to at least one embodiment, the Recurrent Neural Network is executed according to a sequence-to-one architecture, wherein the Recurrent Neural Network receives as inputs sequences of activity events within the multiple activity events and is configured to predict a future activity event based on the sequences in the multiple activity events.

This achieves the technical advantage, that an effective and efficient method for intrusion detection can be provided. Via the sequence-to-one architecture of the Recurrent Neural Network the Recurrent Neural Network is further configured to predict a feature activity event of a particular user profile.

Further, in one or more embodiments, based on the sequences of activity events the Recurrent Neural Network is configured to generate a behavior pattern of a particular user profile. Further through consideration of the generated behavior pattern a detailed and reliable evaluation of future activity events with regard to the degree of normality of that particular activity event can be executed by the Feed-Forward Neural Network. This leads to a detailed and reliable detection of malicious activity.

The prediction of a future activity event by the Recurrent Neural Network can be considered as additional information by the Feed-Forward Neural Network in order to evaluate future activity events. This leads to a further improvement of the accuracy of the method for intrusion detection in detecting malicious activities.

According to at least one embodiment, the Recurrent Neural Network is composed of cells of type Long-Short-Term-Memory.

This achieves the technical advantage, that the Recurrent Neural Network can provide a more accurate behavior pattern by take into consideration a large number of previous activity events and by identifying larger sequences within a large number of activity events. This leads to a further improvement of the accuracy of the method for intrusion detection with regard to the detection of malicious activities. A more accurate behavior pattern allows the Feed-Forward Neural Network to execute a more accurate evaluation of normal and abnormal activities and therefore allows for a more accurate detection of malicious activities and less false evaluations of normal activities as abnormal activities.

According to at least one embodiment, the Feed-Forward Neural Network is configured to evaluate whether the predicted future activity event is a valid event.

This achieves the technical advantage, that a further improvement in accuracy of the method for intrusion detection can be achieved. By including the predicted future activity event into the evaluation of activity events as normal activity events or abnormal activity events by the Feed-Forward Neural Network a more detailed and therefore accurate evaluation process can be achieved. This leads to a more accurate detection of malicious activity and fewer false detections of normal activity events as malicious activities. This leads to a more accurate and reliable method for intrusion detection.

According to one or more embodiments of the invention, a system for intrusion detection to detect malicious insider threat activities within a network of multiple interconnected computerized user profiles is provided, wherein the system is electronically connectable to the network of interconnected user profiles, wherein the system comprises at least one processor unit, and wherein the system is configured to execute the method for intrusion detection to detect malicious insider threat activities within a network of multiple interconnected computerized user profiles according to one or more embodiments of the invention.

This achieves the technical advantage, that a system can be provided that is configured to execute the method for intrusion detection to detect malicious insider threat activities within a network of multiple interconnected computerized user profiles of one or more embodiments of the invention.

BRIEF DESCRIPTION OF THE DRAWINGS

The above-described properties, features and advantages of this invention and the way in which they are achieved will become clearer and more clearly understood in association with the following description of the exemplary embodiments which are explained in greater detail in association with the drawings. Here in schematic illustration in each case:

FIG. 1 shows a flow chart of a method for intrusion detection to detect malicious insider threat activities within a network of multiple interconnected computerized user profiles according to one or more embodiments of the invention;

FIG. 2 shows another flow chart of the method for intrusion detection to detect malicious insider threat activities within a network of multiple interconnected computerized user profiles according to one or more embodiments of the invention;

DETAILED DESCRIPTION OF THE INVENTION

Figure 3:
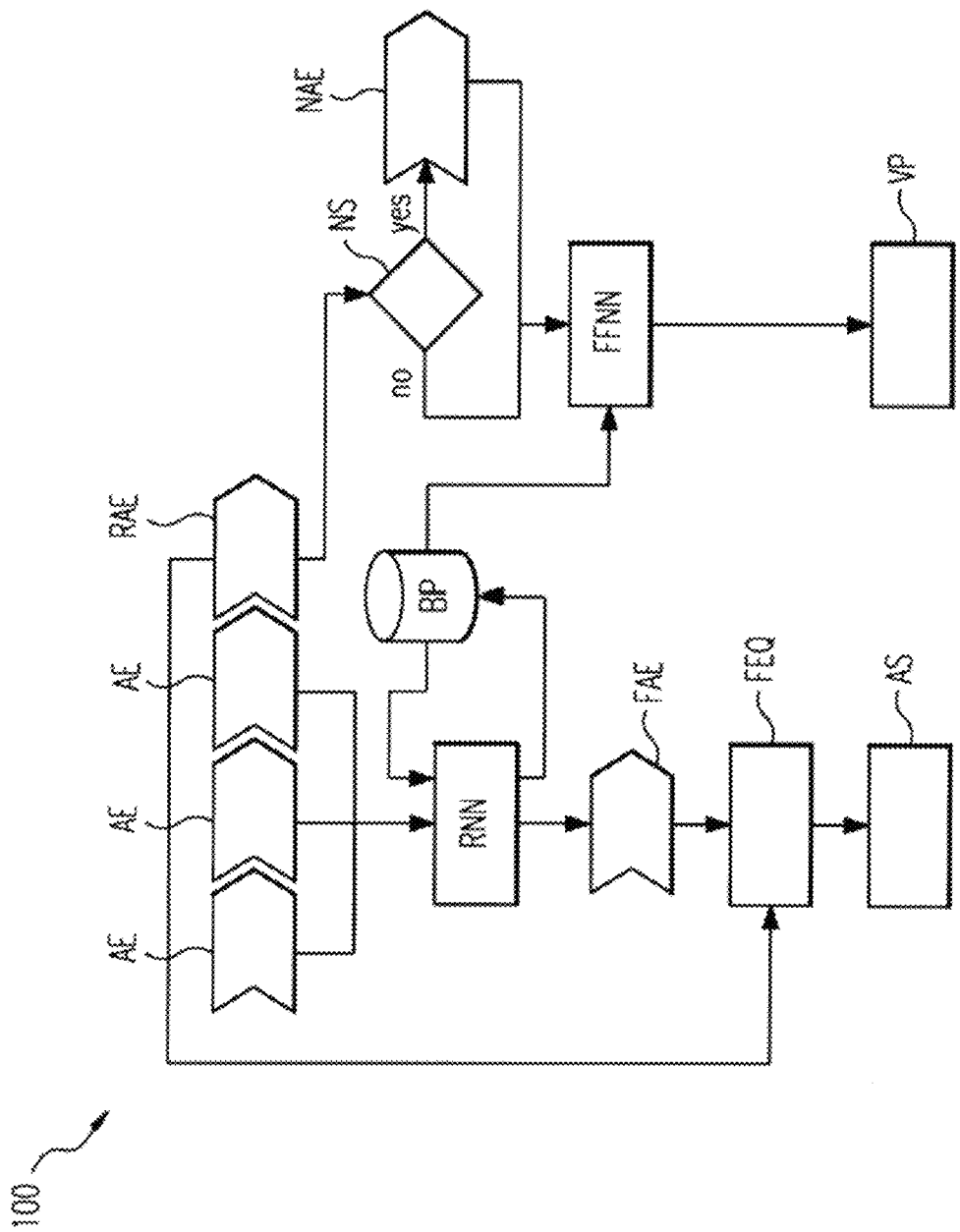
FIG. 3 shows a schematic overview of the method for intrusion detection to detect malicious insider threat activities within a network of multiple interconnected computerized user profiles according to one or more embodiments of the invention.
Figure 4:
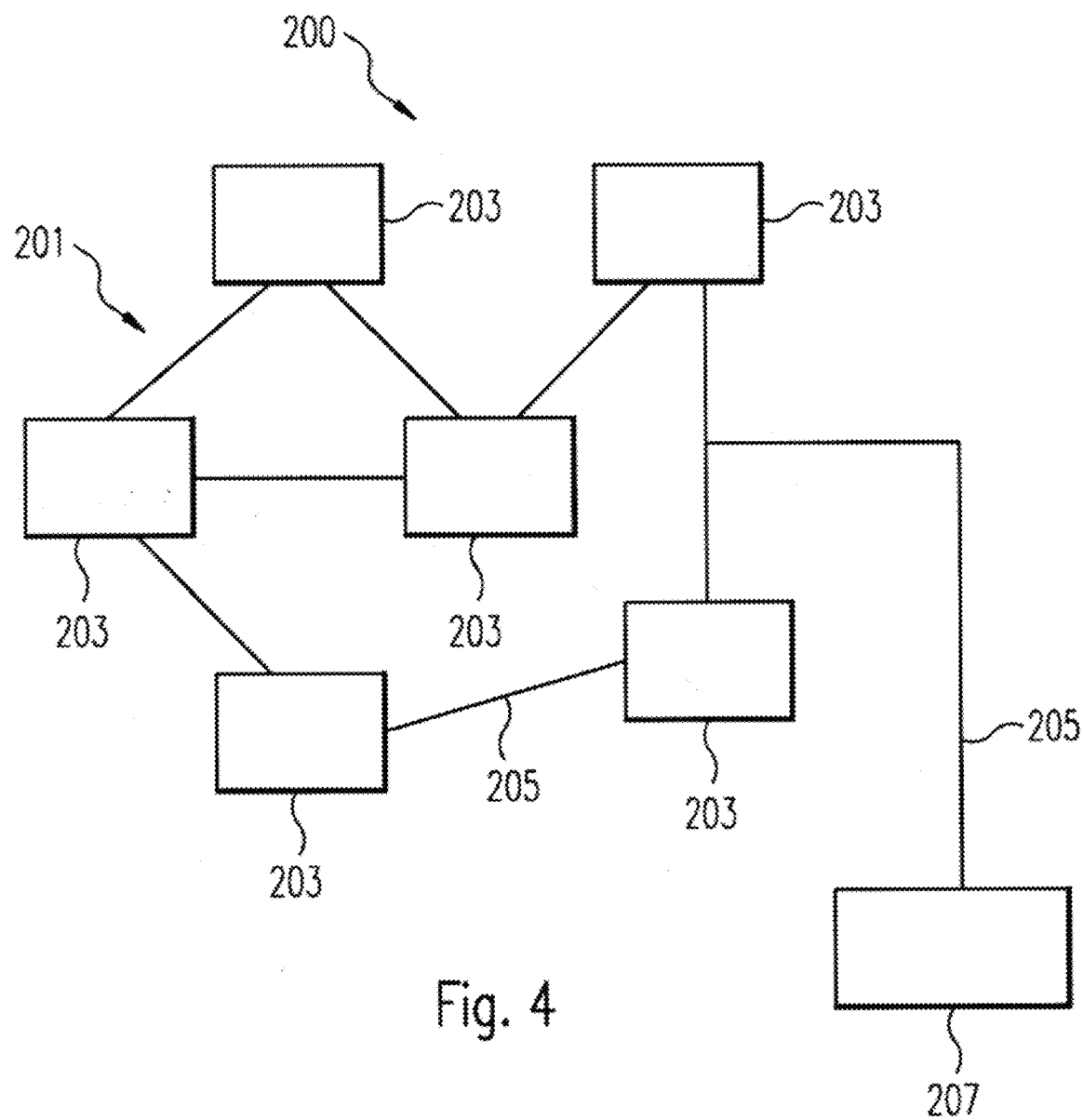
FIG. 4 shows a schematic drawing of a system for intrusion detection to detect malicious insider threat activities within a network of multiple interconnected computerized user profiles according to one or more embodiments of the invention.

The detailed description of FIG. 1 and FIG. 2 will be conducted with reference to FIG. 3 and FIG. 4 and the respective description.

FIG. 1 shows a flow chart of a method 100 for intrusion detection to detect malicious insider threat activities within a network 201 of multiple interconnected computerized user profiles 203 according to one or more embodiments of the invention.

According to at least one embodiment, shown in FIG. 1, the method 100 for intrusion detection to detect malicious insider threat activities within a network 201 of multiple interconnected computerized user profiles 203 is applicable to a network 201 with user profiles 203 that are configured to execute multiple activity events within the network 201 as well as outside the network 201.

According to at least one embodiment, the method 100 comprises the following steps:

Providing 101 multiple activity events AE for each user profile 203,

Determining 103 a behavior pattern BP for each user profile 203 based on the multiple activity events AE, wherein the determination of the behavior pattern BP is executed by at least one trained Recurrent Neural Network RNN, Determining 105 normal activity events and abnormal activity events for each for each user profile 203 based on the multiple behavior patterns BP, wherein the determination of the normal activity events and the abnormal activity events is executed by a trained Feed-Forward Neural Network FFNN, Recording 107 a further activity event RAE of at least one user profile of the multiple user profiles 203, Evaluating 109 whether the recorded activity event RAE of the at least one user profile 203 is a normal activity event or an abnormal activity event based on the behavior pattern BP and the determined normal activity events and abnormal events for that user profile, wherein the evaluation of the recorded activity event RAE is executed by the Feed-Forward Neural Network FFNN, and Detecting 111 malicious activity for the at least one user profile 203, if the recorded activity event RAE is evaluated as an abnormal activity event.

The method 100 is applicable to networks of interconnected computerized user profiles 203 that can be internal networks of companies or organizations of interconnected computer workplaces.

A network 201 of multiple interconnected computerized user profiles 203 can be an intranet network of computerized workplaces within a company or organization that provides multiple users or employees access to databanks and allows for a data communication between users or employees of the company.

The user profiles 203 can be logon profiles installed on the computerized workplaces via which the users or employees can access the intranet of the company or organization.

The user profiles can be individually assigned to particular users or employees of the company and can for example be individualized via certain user names and passwords. In one or more embodiments, the user profiles can be assigned to specific computerized workplaces.

Computerized workplaces can be desktop computers, laptops, mobile devices, industrial computers, server or cloud entities or the like.

Malicious insider threat activities can comprise activities of certain users or employees via certain user profiles 203 that provide a threat to the internal security of the network 201 and therefore to the respective organization or company.

An insider threat can be for example a user who did not previously use removable drives or work after hours begins logging in after hours, using a removable drive, and uploading data to certain web pages, and who leaves the organization or company shortly thereafter.

In one or more embodiments, an internal threat can be a user or employee that begins surfing job websites and soliciting employment from a competitor, before leaving the company or organization, the user or employee uses a thumb-drive to steal a data.

A further instance or a possible insider threat can be a user or employee logging in to another user profile and searching for interesting files and e-mailing to their home e-mail.

Further instances of internal threat scenarios are covered by the scope of one or more embodiments of the invention.

To perform an intrusion detection according to at least one embodiment, as shown in FIG. 1, the method 100 provides in a first method step 101 multiple activity events AE for each user profile 203 of the network 201 of interconnected computerized user profiles 203. The multiple activity events AE can be previous activity events AE of that particular user profile 203.

In one or more embodiments, the multiple activity events AE can be artificial activity events that are generated in order to train the Recurrent Neural Network RNN.

The multiple activity events AE are provided in step 101 are used as training data for the Recurrent Neural Network RNN.

In the following method step 103 the Recurrent Neural Network RNN determines a behavior pattern BP based on the multiple activity events AE for that particular user profile 203.

The Recurrent Neural Network RNN can be executed according to a sequence-to-one architecture and can be configured to identify sequences of activity events AE within the multiple activity events AE and to predict a future activity event FAE based on the identified sequences. The Recurrent Neural Network RNN can further be configured to be of type Long-Short-Term-Memory.

Via the detection of sequences within the multiple activity events AE the Recurrent Neural Network RNN generates a behavior pattern BP. The behavior pattern BP allows to identify a certain behavior of the particular user profile 203 based on the multiple activity events AE.

In a following method step 105 the generated behavior pattern BP is used as training data for the Feed-Forward Neural Network FFNN and the Feed-Forward Neural Network FFNN determines normal activity events and abnormal activity events based on the behavior pattern BP for a respective user profile 203. For this, the Feed-Forward Neural Network FFNN can further be provided with examples for normal activity events and abnormal activity events. The abnormal activity events can be generated by negative sampling of the multiple activity events AE, evaluated as normal activity events.

The Recurrent Neural Network RNN and the Feed-Forward Neural Network FFNN can be trained jointly, as the same set of activity data AE is used for the training of both neural networks.

After the training of the neural networks is completed, in the following method step 107 an activity events RAE of a certain user profile 203 is recorded. The recorded activity event RAE is a real activity event of a certain user profile 203 that relates to a certain activity that particular user profile 203 executed.

In a following method step 109 this recorded activity event RAE is input into the Feed-Forward Neural Network FFNN. The Feed-Forward Neural Network FFNN then evaluates based on the behavior pattern BP and the normal activity events and the abnormal activity events, the Feed-Forward Neural Network FFNN learned to identify during the training phase, whether the recorded activity events RAE is a normal activity event or an abnormal activity event for that particular user profile 203.

By way of at least one embodiment, if the recorded activity event RAE complies with the behavior pattern BP, generated by the Recurrent Neural Network RNN for that particular user profile 203, and with the normal activity events, the Feed-Forward Neural Network FFNN has learned for that particular behavior pattern BP of the user profile 203 during the training phase, the Feed-Forward Neural Network FFNN evaluates the recorded activity event RAE as a normal activity event for that particular user profile 203. In at least one embodiment, if the Feed-Forward Neural Network FFNN however evaluates the recorded activity event RAE as not complying with the respective behavior pattern BP and the respective normal activity events for that particular user profile 203, the Feed-Forward Neural Network FFNN identifies the recorded activity event RAE as an abnormal activity event.

In the following method step 111 a malicious activity is identified for that particular user profile 203, if the Feed-Forward Neural Network FFNN evaluates the recorded activity event RAE as an abnormal activity event for that particular user profile 203.

According to at least one embodiment, as shown in FIG. 1, the method 100 further comprises the method step:

Stopping 113 all activities of the at least one user profile 203 and/or removing the at least one user profile 203 from the network 201.

If a malicious activity is identified for a user profile 203, all activities of that particular user profile 203 are stopped and/or the user profile 203 is removed from the network 201 in the following method step 113.

According to at least one embodiment, activity events AE can comprise logon events, where a user or employee logs on to a certain user profile, e-mail events, where an e-mail is sent or received between different user profiles 203 of the network 201 or between a user profile 203 of the network 201 and an entity external to the network 201, and web browsing events, where a user profile 203 accesses a web page of the Internet.

In one or more embodiments, multiple previous logon events for a certain user profile 203 can be recorded. In this case, certain information regarding the time, when a certain user or employee of the company tried to logon to the respective user profile, as well as the computerized workplace, from which the user or employee tried to logon to the user profile can be recorded. Further, in at least one embodiment, information regarding failed logons due to wrong user name or password introductions can be recorded.

Based on these multiple information regarding the logon events the Recurrent Neural Network can be used to identify a certain behavior pattern, that illustrates a certain logon behavior of a particular user profile, that illustrates a history of logon events over a certain time period.

Based on this behavior pattern, the Feed-Forward Neural Network can be used to evaluate normal logon events and abnormal logon events. For the evaluation of abnormal logon events, by way of at least one embodiment, the Feed-Forward Neural Network can further be trained on examples of abnormal logon events. As examples for abnormal logon events logon events can be generated with artificially abnormal logon times, artificially abnormal computerized workplaces from which the logon events were executed and instances of logon events executed by using wrong user names and passwords. When normal logon events of that particular user or employee or that particular user profile usually take place during normal work hours, artificially generated abnormal logon events can for example include logon events taking place at logout times outside normal work hours.

Further, in one or more embodiments, if usual logon events for that particular profile are executed from a certain computerized workplace within the network of the company or organization, artificially generated abnormal logon events can include the execution of the logon event from a computer that is not part of the internal network of the company or organization.

Based on the multiple logon events of that particular user profile, that are labelled as normal logon events, and the artificially generated abnormal logon events, the Feed-Forward Neural Network learns to identify normal and abnormal logon events.

If then a user or employee of the company or network logs on that particular user profile, the respective logon event is recorded and fed in to the Feed-Forward Neural Network in order to evaluate whether this logon event is normal or abnormal based on the behavior pattern generated by the Recurrent Neural Network and based on the normal and abnormal logon events, the Feed-Forward Neural Network learned to identify during the training process.

If the Feed-Forward Neural Network then identifies the recorded logon event as an abnormal logon event, this abnormal logon event can be identified as a malicious activity and the respective user profile can be shut down and removed from the network.

According to one or more embodiments, the method 100 is applicable to all user profiles 203 of the network 201 of the company or organization. For this, multiple Recurrent Neural Networks RNN and Feed-Forward Neural Networks FFNN can be assigned to the multiple user profiles, such that for each user profile 203 an individual Recurrent Neural Network RNN and an individual Feed-Forward Neural Network FFNN can be used.

FIG. 2 shows another flow chart of the method 100 for intrusion detection to detect malicious insider threat activities within a network 201 of multiple interconnected computerized user profiles 203 according to one or more embodiments of the invention.

The embodiment of the method 100 shown in FIG. 2, by way of at least one embodiment, is based on the embodiment shown in FIG. 1 and comprises all method steps shown in FIG. 1. Thus, in order to avoid repetition these method steps shown in FIG. 1 will not be described in detail with regard to FIG. 2.

According to at least one embodiment, as shown in FIG. 2, the method 100 comprises a further method step 115. In the method step 115 for the multiple activity events AE provided in the method step 101 a graph representation is generated. In the graph representation the activity events AE can be represented by the edges of the graph representation.

For example, in one or more embodiments, nodes of the graph representation can represent different user profiles 203 of the network 201 and edges between the nodes in the graph representation can represent e-mail events between the user profiles 203. Further, in at least one embodiment, the edges can be provided with additional attributes that provide further information regarding the activity events AE. In the case of the e-mail events, the further attributes can include a certain time, when the e-mail was sent or received by the respective user profile 203, if further data were attached to that sent or received e-mail, or other information important regarding the e-mail event.

In the case of the activity events AE representing logon events, in at least one embodiment, the nodes in the graph representation can represent a certain user profile 203 and different computerized workplaces of the company or computers not part of the network 201 of the company or organization. The edges between the nodes in the graph representation can then be representing the logon events to the respective user profile 203 from the different computerized workplaces or computers external to the network 201. The edge, i.e. the logon events, can further be attributed by additional information such as the logon time, the logon date, the used user name or password, possible typing mistakes while typing the user name and/or password, the time span that was needed to type the user name and password or other information of interest regarding the logon events.

In case of the activity events representing web browsing events, in at least one embodiment, the nodes in the graph representation can represent the respective user profile 203 and web pages accessed via the user profile. The edges between the nodes in the graph representation can represent web browsing events, where the respective user profile tried to access certain web pages on the Internet. The edges, i.e. the web browsing events, can further be attributed with information regarding the time the user profile 203 accessed a particular web page, certain requests in the web browser, other activities of the user profile 203 on the respective web page, access of the user profile 203 to other web pages via links of the previously accessed web page or other information of importance regarding the web browsing events.

After the generation of the graph representation of the multiple activity events AE in the method step 115 an embedding of each of the graph representations is performed in a following method step 117. The graph embedding can be performed using graph embedding algorithms known from state of the art. Via the graph embedding a vector representation of the graph representation of the multiple activity events AE can be achieved.

These vector representations generated by the graph embedding can then be used in a following method step 119 as input to the Recurrent Neural Network RNN and/or the Feed-Forward Neural Network FFNN.

FIG. 3 shows a schematic overview of the method 100 for intrusion detection to detect malicious insider threat activities within a network 201 of multiple interconnected computerized user profiles 203 according one or more embodiments of the invention.

The method 100 focuses on predicting the validity of links between a source and destination entity. Such link can be between a user profile and a pc, in case of logon activity, between a user profile 203 and a web domain, in case of web browsing event, or between a user profile as sender and/or receiver and another email account, in case of email event.

To this aim a combination of a sequence-to-one Recurrent Neural Network RNN and a Feed-Forward Neural Network FFNN is used, wherein both networks are trained jointly.

FIG. 3 shows multiple activity events of a certain user profile that are fed into the Recurrent Neural Network RNN for training purposes, according to one or more embodiments of the invention. The Recurrent Neural Network is executed according a sequence-to-one architecture and is configured to identify sequences of activity events and to predict a further activity event FAE. During the training process the Recurrent Neural Network generates a behavior pattern BP, that illustrates a certain behavior of the respective user profile 203 based on the multiple activity events AE.

In addition to the behavior pattern BP the Recurrent Neural Network RNN predicts a future activity event FAE. The future activity event FAE is based on the multiple activity events AE. For this, the Recurrent Neural Network RNN uses Long-Short-Term-Memory in order to predict the next event of sequences of multiple activity events AE.

The behavior pattern BP generated by the Recurrent Neural Network RNN is then fed into the Feed-Forward Neural Network FFNN as training data for the Feed-Forward Neural Network FFNN. Based on the behavior pattern BP, which is based on the multiple activity events AE, the Feed-Forward Neural Network FFNN is then trained to evaluate normal activity events and abnormal activity events with regard to the behavior pattern BP.

The Recurrent Neural Network RNN uses a mixture of mean squared error (for numeric features), cross-entropy (for one-hot encoded features) and cosine loss (for embeddings). FIG. 3 shows the full architecture with joint Recurrent Neural Network RNN and Feed-Forward Neural Network FFNN, and details how both are trained simultaneously. For each user profile 203 a separate behavior pattern BP is generated.

For the training of the Feed-Forward Neural Network FFNN to evaluate normal and abnormal activity events, by way of at least one embodiment, the activity events AE are interpreted as normal activity events. In order to provide the Feed-Forward Neural Network with examples of abnormal activity events negative sampling NS of activity events AE is performed in order to generate negative activity events NAE, that represent artificial abnormal activity events. Based on the activity events AE, which are interpreted as normal activity events, and the respective negative activity events NAE generated via the negative sampling NS, which are interpreted as abnormal activity events, the Feed-Forward Neural Network FFNN is trained to evaluate recorded activity events RAE of user profiles 203 as normal activity events or abnormal activity events with regard to previous activity events of a particular user profile.

After the joined training of the Recurrent Neural Network RNN and the Feed-Forward Neural Network FFNN between networks can be used to identify malicious activities. For this, by way of at least one embodiment, an activity event RAE of the particular user profile 203 is recorded.

This recorded activity event RAE is then fed into the Feed-Forward Neural Network as input data and the Feed-Forward Neural Network FFNN evaluates whether the recorded activity event RAE is a normal activity event or an abnormal activity event based on the behavior pattern BP of that particular user profile 203 and based on the normal activity events and abnormal activity events the Feed-Forward Neural Network FFNN has learned to identify during the training period.

The Feed-Forward Neural Network FFNN then outputs a validity probability VP. The validity probability VP provides a number value that gives a probability that the recorded activity event RAE is a normal activity event or an abnormal activity event with regard to the behavior pattern BP of that particular user profile 203. Based on this validity probability VP a malicious activity can be detected.

Further, in one or more embodiments, the recorded activity event RAE is compared to the predicted future activity event FAE predicted by the Recurrent Neural Network RNN based on the multiple activity events AE. Based on the comparison between the predicted further activity event FAE and the recorded activity event RAE a feature error quantile FEQ is generated. The feature error quantile FEQ provides a number value for the agreement between the predicted future activity event FAE and the actually recorded activity event RAE. Based on the feature error quantile FEQ a sequence-to-one anomaly score AS is generated. The sequence-to-one anomaly score AS provides a number value for the deviation of the actually recorded activity event RAE from the behavior pattern BP based on the previous activity events AE.

For the calculation of the feature error quantiles FEQ, feature errors are calculated via mean squared error in the case of numeric features and for categorical features the error can be expressed as $1-p$ where p is obtained by applying a softmax function. Those feature error values are then converted into feature error quantiles FEQ and finally averaged into a single event anomaly score AS. This procedure ensures that all features have the same weight in the anomaly score AS.

In different stages of the method 100 according to one or more embodiments, not shown in FIG. 3, the actually recorded activity events RAE can be included into the multiplicity of activity events on which the Recurrent Neural Network RNN is trained and on which the Recurrent Neural Network RNN generates the behavior pattern BP. Further, in at least one embodiment, based on the actually recorded activity events RAE negative activity events can be generated via a negative sampling NS in order to provide the Feed-Forward Neural Network FFNN with examples of abnormal activity events. The training process of the Recurrent Neural Network RNN and the Feed-Forward Neural Network FFNN can then be proceeded or restarted based on the multiplicity of activity events AE including the multiple recorded activity events RAE. Thus, in one or more embodiments, a further improvement of the accuracy of detecting abnormal activity events and with this of detecting malicious activities of the method 100 can be achieved.

The recorded activity events RAE are activity events AE of a user profile 203 that are recorded during the time of activity observation via the execution of method 100.

For the evaluation of the recorded activity events RAE as malicious activities, a recall-based metrics can be used based on recall curves and cumulative recall at budget k ($CR_k$).

These metrics are realistic from the perspective of an organization with a fixed budget to investigate alerts generated by an insider threat detection system. The organization's daily budget k is fixed and represents the number of (most suspicious) users to be investigated each day. If a malicious user is investigated on a given day, all his malicious activities conducted that day are considered as detected. Recall at budget $R_k$ is computed as the average threat recall over all test days (days with no malicious activity are ignored while averaging).

A cumulative recall metrics can be used to evaluate the methods, according to one or more embodiments of the invention. Therefore, in at least one embodiment, it is assumed that the organization or company has a certain daily budget to investigate alerts reported by the threat detection system. Given a certain budget, the aim is to maximize the recall of malicious samples. Thus, in at least one embodiment, audit records are generated at user-day level, which is logically the unit used both for the budget (number of users to investigate per day) and the recall (number of malicious users detected on a given day among all malicious users that day). In the current case, by way of at least one embodiment, detection is performed at event level, a much finer granularity. However, still user-day level budgets and recalls can be considered. So for each day the recall (in terms of malicious users) for the given budget is computed and then averaged over all days. This recall $R_k$ (at fixed budget k) is computed for several budget steps up to the maximum budget $k_{max}$. Then for each budget step the normalized cumulative recall as $CR_k = \Sigma_{i=0}^{k\_max} R_i/n$ is computed, where n is the number of budget steps.

FIG. 4 shows a schematic drawing of a system 200 for intrusion detection to detect malicious insider threat activities within a network 201 of multiple interconnected computerized user profiles 203 according to one or more embodiments of the invention.

The system 200 comprises a processor unit 207. The processor unit 207 is connected to a network 201 of multiple interconnected user profiles 203. The user profiles 203 are connected via a data connection 205 configured to conduct data transfer and data communication between the multiple user profiles 203.

The multiple user profiles 203 can be assigned to individual computerized workplaces. In at least one embodiment, the multiple user profiles 203 can be organized on a computer server unit. The network 201 can be a network of different computerized workplaces of a company or any comparable organization.

The processor unit 207 is connected to the network 201 via the data connection 205 and is configured to execute the method 100.

The illustration of the network 201 and the multiple user profiles 203 in FIG. 3 is merely for illustrative purpose. Modifications of the network 201, the multiple user profiles 203, in particular the organization of the network 201 including the interconnection of the multiple user profiles 203 as well as the number of user profiles 203, are covered by the scope of one or more embodiments of the invention.

LIST OF REFERENCE SIGNS 100 method for intrusion detection to detect malicious insider threat activities within a network of multiple interconnected computerized user profiles
101 providing multiple activity events
103 determining a behavior pattern
105 determining normal and abnormal activity events
107 recording a further activity event
109 evaluating the recorded activity event
111 detecting malicious activity
113 stopping activity and/or removing further user profile from network
115 generating graph representations
117 encoding graph nodes as embeddings
119 recording a further activity event
121 using multiple graph embeddings as input to Neural Networks
200 system for intrusion detection to detect malicious insider threat activities within a network of multiple interconnected computerized user profiles
201 network
203 user profile
205 data connection
207 processor unit
AE activity event
RAE recorded activity event
FAE predicted future activity event
NAE negative activity event
RNN Recurrent Neural Network
FFNN Feed-Forward Neural Network
BP behavior pattern
FEQ feature error quantile
AS sequence-to-one anomaly score
VP validity probability
NS negative sampling

What is claimed is:

1. A method for intrusion detection to detect malicious insider threat activities within a network of multiple interconnected computerized user profiles, wherein each user profile of the multiple interconnected computerized user profiles is configured to execute activity events within the network of the multiple interconnected computerized user profiles, the method comprising:
   providing multiple activity events for said each user profile;
   determining a behavior pattern for each user profile based on the multiple activity events, wherein the determining of the behavior pattern is executed by at least one Recurrent Neural Network (RNN);
   determining normal activity events and abnormal activity events for each of said each user profile based on the behavior pattern of said each user profile, wherein the determining of the normal activity events and the abnormal activity events is executed by a Feed-Forward Neural Network (FFNN);
   recording a further activity event of at least one user profile of the multiple interconnected computerized user profiles;
   evaluating whether the further activity event that is recorded of the at least one user profile is a normal activity event or an abnormal activity event based on the behavior pattern and the normal activity events and abnormal events that are determined for a corresponding user profile,
     wherein the evaluating of the further activity event that is recorded is executed by the Feed-Forward Neural Network (FFNN); and,
   detecting malicious activity for the at least one user profile, if the further activity event that is recorded is evaluated as said abnormal activity event.

2. The method according to claim 1, further comprising generating a graph representation of the multiple activity events for said each user profile, wherein the multiple activity events are represented by edges within the graph representation, computing an embedding of each graph representation that is generated of each of the multiple activity events of said each user profile, and using each of the embedding of said each graph representation as input to one or more of the at least one Recurrent Neural Network (RNN) and the Feed-Forward Neural Network (FFNN).

3. The method according to claim 1, wherein for said each user profile of the network of multiple interconnected computerized user profiles an individual Recurrent Neural Network and an individual Feed-Forward Neural Network (FFNN) is used.

4. The method according to claim 1, further comprising training of the at least one Recurrent Neural Network (RNN) and the Feed-Forward Neural Network (FFNN) jointly based on the multiple activity events and the behavior pattern for said each user profile.

5. The method according to claim 1, wherein the multiple activity events comprise one or more of logon events, email events, and web browsing events, wherein a logon event comprises a logon to a user profile, wherein an email event comprises one or more of sending and receiving of an email via the user profile, and wherein said web browsing events comprise access of web pages via the user profile.

6. The method according to claim 1, wherein the at least one Recurrent Neural Network (RNN) is executed according to a sequence-to-one architecture, and wherein the at least one Recurrent Neural Network (RNN) is configured to identify sequences of activity events within the multiple activity events and to predict a future activity event based on the sequences of activity events that are identified in the multiple activity events.

7. The method according to claim 6, wherein the Feed-Forward Neural Network (FFNN) is further configured evaluate whether the future activity event that is predicted is a normal activity event or an abnormal activity event.

8. The method according to claim 1, wherein the at least one Recurrent Neural Network (RNN) is configured to use Long-Short-Term-Memory.

9. The method according to claim 1, further comprising one or more of stopping all activities of the at least one user profile, and removing the at least one user profile from the network.

10. A system for intrusion detection to detect malicious insider threat activities within a network of multiple interconnected computerized user profiles, wherein the system is electronically connectable to the network of multiple interconnected computerized user profiles, wherein the system comprises:

at least one processor unit; and wherein the system is configured to execute a method for said intrusion detection to detect said malicious insider threat activities within the network of the multiple interconnected computerized user profiles;

wherein each user profile of the multiple interconnected computerized user profiles is configured to execute activity events within the network of the multiple interconnected computerized user profiles, the method comprising providing multiple activity events for said each user profile, determining a behavior pattern for each user profile based on the multiple activity events, wherein the determining of the behavior pattern is executed by at least one Recurrent Neural Network (RNN), determining normal activity events and abnormal activity events for each of said each user profile based on the behavior pattern of said each user profile, wherein the determining of the normal activity events and the abnormal activity events is executed by a Feed-Forward Neural Network (FFNN), recording a further activity event of at least one user profile of the multiple interconnected computerized user profiles, evaluating whether the further activity event that is recorded of the at least one user profile is a normal activity event or an abnormal activity event based on the behavior pattern and the normal activity events and abnormal events that are determined for a corresponding user profile, wherein the evaluating of the further activity event that is recorded is executed by the Feed-Forward Neural Network (FFNN); and, detecting malicious activity for the at least one user profile, if the further activity event that is recorded is evaluated as said abnormal activity event.

* * * * *